United States Patent
Kobayashi (10) Patent No.: US 6,430,149 B1
(45) Date of Patent: Aug. 6, 2002

(54) PROCESSING CIRCUITS FOR COMPLEX OPERATION

(75) Inventor: Shinji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/281,133

(22) Filed: Mar. 29, 1999

(30) Foreign Application Priority Data

Apr. 1, 1998 (JP) ............................................. 10-088640

(51) Int. Cl.$^7$ ................................................ H04J 11/00
(52) U.S. Cl. ........................ 370/208; 370/210; 708/404; 375/261
(58) Field of Search ................................. 370/203, 208, 370/210, 281, 319, 343, 344, 504; 708/403, 404; 375/261, 324

(56) References Cited

U.S. PATENT DOCUMENTS

| 5,771,224 A | * | 6/1998 | Seki et al. | 370/206 |
| 5,959,965 A | * | 9/1999 | Ohkubo et al. | 370/203 |
| 6,038,275 A | * | 3/2000 | Taura et al. | 370/516 |

* cited by examiner

Primary Examiner—Alpus H. Hsu
Assistant Examiner—Duc Ho
(74) Attorney, Agent, or Firm—Jay H. Maioli (57) ABSTRACT

A processing circuit for a complex operation, includes buffer memories in which a pair of quadrature demodulation output signals based on a modulated carrier wave signal obtained in accordance with the orthogonal frequency division multiplex system are temporary stored, a complex operation processor for causing the quadrature demodulation output signals read from the buffer memories to be subjected to complex operation processing for fast fourier transform (FFT) and further for causing operation processing output signals obtained through the complex operation processing for FFT to be subjected to complex operation processing for differential demodulation to produce data outputs, an operation controller operative to supply the complex operation processor with operation control signals for causing the complex operation processor to conduct the complex operation processing for FFT and the complex operation processing for differential demodulation, and a program storing memory operative to supply the operation controller with program data for causing the operation controller to control the complex operation processor in accordance with an operation program represented by the program data so that the complex operation processor performs the complex operation processing for FFT and the complex operation processing for differential demodulation as time sharing processings at time share arranged in response to the data format of each of the quadrature demodulation output signals.

3 Claims, 5 Drawing Sheets

PROCESSING CIRCUITS FOR COMPLEX OPERATION

BACKGROUND OF THE INVENTION

1. Field of the Invention

The present invention relates generally to a processing circuit for a complex operation, and more particularly, is directed to an improvement in a processing circuit for a complex operation which is operative to receive a pair of orthogonal demodulation output signals obtained by causing an orthogonal frequency division multiplexing signal to be subjected to quadrature demodulation, to cause each of the orthogonal demodulation output signals to be subjected to complex operation processing for fast Fourier transform and to cause the result of the complex operation processing for fast Fourier transform to be subjected to complex operation processing for differential demodulation so as to obtain reproduced data outputs based on the orthogonal frequency division multiplexing signal.

2. Description of the Prior Art

Although an analog audio broadcasting system which includes an amplitude-modulated (AM) audio broadcasting system in which audio signals are transmitted in the form of an AM audio information signal and a frequency-modulated (FM) audio broadcasting system in which audio signals are transmitted in the form of an FM audio information signal, has been put to practical use for a long time in the field of audio broadcasting, there has been recently proposed to introduce a digital audio broadcasting system in which audio signals are transmitted in the form of a digital audio information signal for the purpose of improving quality of audio information transmitted or received in the system. Especially, in the region of Europe, the digital audio broadcasting system called a "DAB" system has been already put to practical use in some countries.

The digital audio information signal transmitted from a broadcasting station under the digital audio broadcasting system is called a digital audio broadcasting signal. The digital audio broadcasting signal carries not only audio information data forming a digital audio signal but also service information data representing service information, such as weather forecast, traffic information and so on, and further carries control information data which are necessitated for reproducing the digital audio signal based on the audio information data and the service information based on the service information data on the receiving side. Then, the digital audio broadcasting signal is a modulated wave signal obtained by modulating a carrier wave signal with digital data, such as audio information data, service information data, control information data and so on, in accordance with the Orthogonal Frequency Division Multiplexing (OFDM) system and the digital data transmitted by the digital audio broadcasting signal is composed of a series of frame units, each of which is called a transmission frame.

Figure 1A:
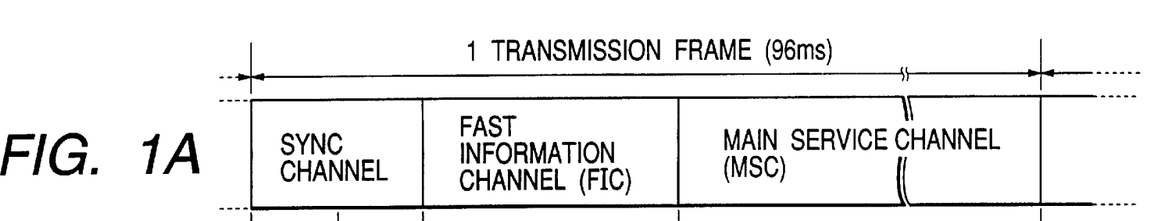
FIGS. 1A to 1C are illustrations showing a data format used for explaining a digital audio broadcasting signal.
Figures 1B, 1C:
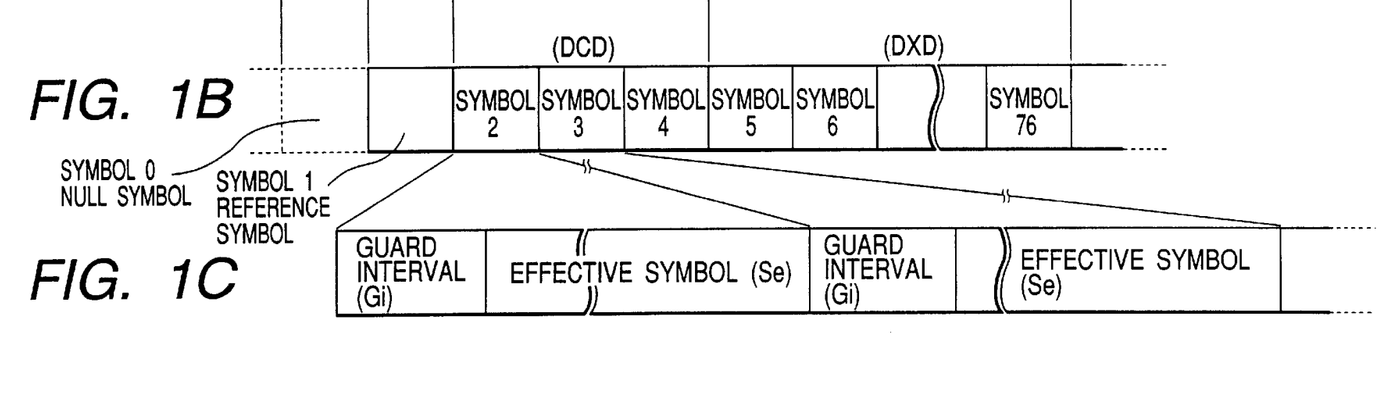

The transmission frame has a time duration of, for example, 96 ms and contains 77 segmental periods each named Symbol and identified with Symbol 0 to Symbol 76, respectively, as shown in FIGS. 1A and 1B. The Symbol 0 is a null Symbol where the modulated wave signal does not exist in actual fact. The Symbol 1 is a reference Symbol for synchronization. The Symbol 0 which is the null Symbol corresponds to about 1.3 ms and each of the Symbol 0 to the Symbol 76 corresponds to about 1.25 ms.

A channel named Synchronous Channel is allocated to the Symbol 0 and the Symbol 1, a channel named Fast Information Channel (FIC) is allocated to the Symbol 2 to the Symbol 4 following the Symbol 1, and a channel named Main Service Channel (MSC) is allocated to the Symbol 5 to the Symbol 76 following the Symbol 4, as shown in FIGS. 1A and 1B. The MSC is composed of a series of frames each named Common Interleaved Frame (CIF) for transmitting the audio information data and the service information data. The FIC is composed of series of blocks each named First Information Block (FIB). The FIB contains a couple of portions of a FIB data field and an error checking word, and the FIB data field is composed of a series of groups each named Fast Information Groups (FIGS). The FIC thus formed transmits the control information data representing multiplex configuration information (MCI) and other information.

Each of the Symbol 1 to the Symbol 76 contains a couple of portions Gi and Se, as shown in FIG. 1C. The portion Gi is named Guard Interval and corresponds to about 0.246 ms. The portion Se is named Effective Symbol and corresponds to about 1 ms.

The above described digital audio broadcasting signal which is a modulated carrier wave signal obtained by modulating a carrier wave signal with digital data, such as audio information data, service information data, control information data and so on, in accordance with the OFDM system and transmitting the digital data in the form of a series of the transmission frames, is received by use of a digital audio broadcasting signal receiver.

In the digital audio broadcasting signal receiver, each of digital audio broadcasting signals transmitted respectively from a plurality of broadcasting stations is received selectively through a tuning operation by a tuner and the received digital audio broadcasting signal is subjected to demodulation processing, data selection and so on so as to produce audio information data, service information data and control information data. The audio information data and service information data are further subjected to decoding processing for producing digital audio signals and service data.

Figure 2:
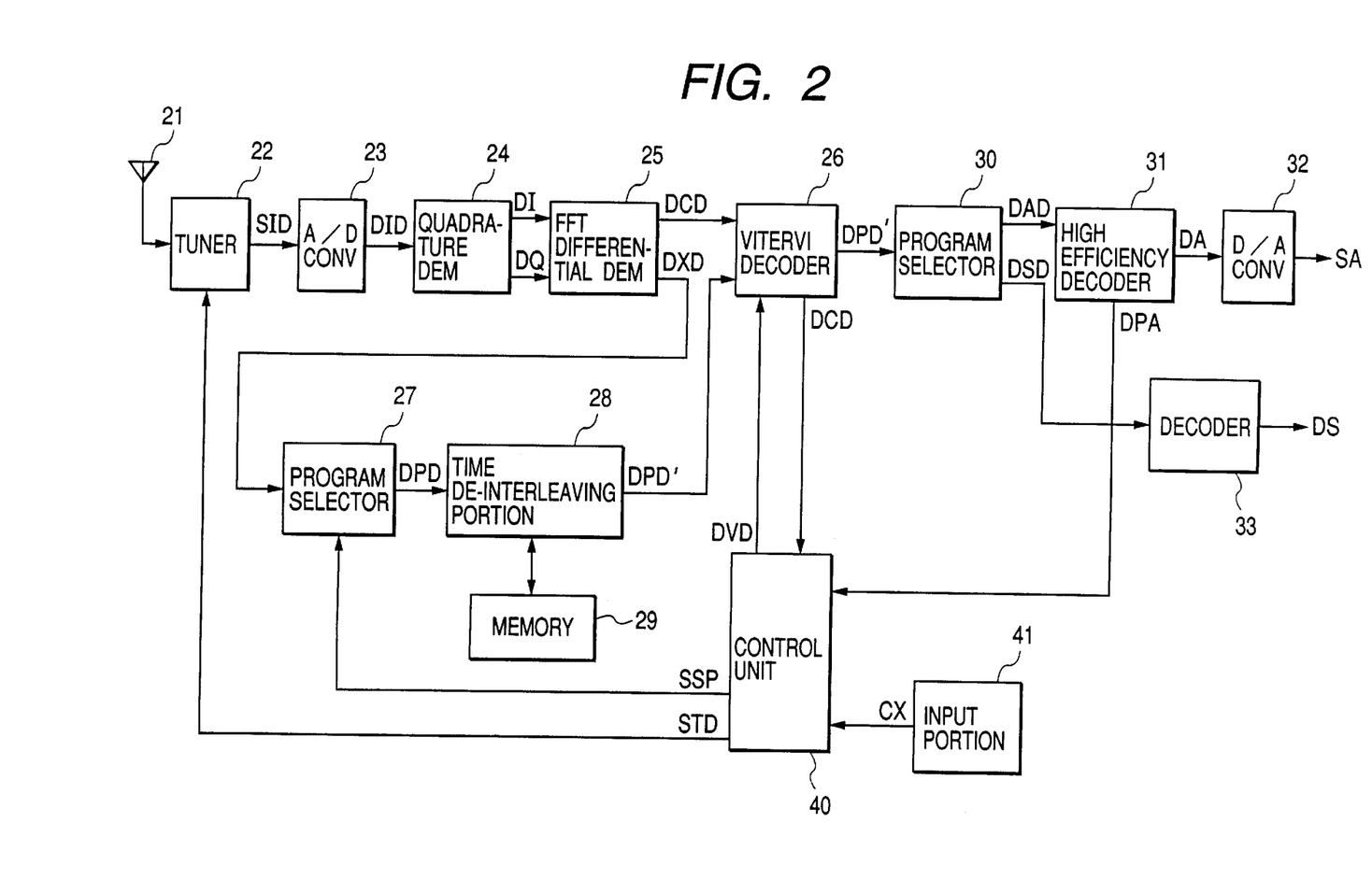
FIG. 2 is a schematic block diagram showing an example of a digital audio broadcasting signal receiver.

FIG. 2 shows an example of the digital audio broadcasting signal receiver which has been generally proposed. In the digital audio broadcasting signal receiver shown in FIG. 2, a digital audio broadcasting signal, which is a modulated carrier wave signal obtained in accordance with the OFDM system, transmitted from a broadcasting station and having reached to a receiving antenna 21, is received through a tuning operation by a tuner 22. The tuning operation by the tuner 22 is performed in accordance with a tuning control signal STD supplied to the tuner from a control unit 40. In the tuner 22, the digital audio broadcasting signal received selectively is subjected to amplifying processing and frequency-converting processing to produce an intermediate frequency (IF) signal SID. The IF signal SID is supplied to an analog to digital (A/D) convertor 23.

A digital IF signal DID corresponding to the IF signal SID is obtained from the A/D convertor 23 to be supplied to a quadrature demodulator 24. In the quadrature demodulator 24, the digital IF signal DID is subjected to quadrature demodulation processing to produce I and Q signals DI and DQ which are a pair of quadrature demodulation output signals.

The I and Q signals DI and DQ obtained from the quadrature demodulator 24 are supplied to a fast Fourier transform (FFT) differential demodulator 25. In the FFT differential demodulator 25, each of the I and Q signals DI and DQ is subjected to transformation from a time domain signal to a frequency domain signal to produce control information data DCD representing control information transmitted through the FIC and composite data DXD composed of audio information data and service information data representing respectively audio information and service information transmitted through the MSC.

The audio information data and service information data constituting the composite data DXD have been subjected to time interleaving arrangements respectively to form time interleaved audio information data and time interleaved service information data. Each of the audio information data and service information data are composed of a series of logical frames each having a time duration of, for example, 24 ms and corresponding to the CIF. The time interleaving arrangement to which each of the audio information data and service information data have been subjected has been carried out to each interleaving completion segment consisting of, for example, successive sixteen logical frames. Each of the logical frames is composed of a series of 864 capacity units each forming the unit data corresponding to 64 bits.

The control information data DCD obtained from the FFT differential demodulator 25 are supplied directly to a Vitervi decoder 26, and the composite data DXD obtained from the FFT differential demodulator 25 are supplied to a program selector 27.

A program selection control signal SSP is also supplied to the program selector 27 from the control unit 40. In the program selector 27, a data selection processing by which one of various kinds of program information data contained in the audio information data constituting the composite data DXD or one of various kinds of program information data contained in the service information data constituting the composite data DXD are selected to be extracted from the audio information data or service information data is carried out in response to the program selection control signal SSP. Thereby, time interleaved program information data DPD selected by the data selection processing are derived from the program selector 27 to a time de-interleaving portion 28.

In the time de-interleaving portion 28, the time interleaved program information data DPD are subjected to a time de-interleaving arrangement to be released from the time interleaving arrangement. In the time de-interleaving arrangement to which the time interleaved program information data DPD are subjected, first, capacity units, each of which forms unit data constituting the time interleaved program information data DPD contained in successive sixteen logical frames derived from each of interleaving completion segments of the composite data DXD, are successively supplied from the time de-interleaving portion 28 to a memory 29 to be stored once in the memory 29. Then, after the whole capacitor units each forming the unit data constituting the time interleaved program information data DPD contained in those successive sixteen logical frames are once stored in the memory 29, the capacitor units stored in the memory 29 are read from the memory 29 in a predetermined de-interleaving manner to be supplied through the memory 29 to the time de-interleaving portion 28 so as to produce newly successive sixteen logical frames as time de-interleaved program information data DPD'. As a result, the time de-interleaved program information data DPD' are obtained in the time de-interleaving portion 28 and then derived from the time de-interleaving portion 28 in the form of time de-interleaved audio information data or time de-interleaved service data.

The time de-interleaved program information data DPD' obtained from the time de-interleaving portion 28 are supplied to the Vitervi decoder 26. In the Vitervi decoder 26, the control information data DCD from the FFT differential demodulator 25 and the time de-interleaved program information data DPD' from the time de-interleaving portion 28 are subjected respectively to error correction processings. The time de-interleaved program information data DPD' subjected to the error correction processing are supplied from the Vitervi decoder 26 to a program selector 30 and the control information data DCD subjected to the error correction processing are supplied from the Vitervi decoder 26 to the control unit 40.

Audio program data DAD or service program data DSD which are obtained based on the time de-interleaved program information data DPD' subjected to the error correction processing from the Vitervi decoder 26 are derived from the program selector 30.

The audio program data DAD derived from the program selector 30 are supplied to a high efficiency decoder 31. In the high efficiency decoder 31, the audio program data DAD are subjected to a high efficiency decoding by which data suppressed in accordance with a high efficiency coding are expanded to produce decoded audio data DA. Further, program associated data DPA which are contained in the audio program data DAD are obtained from the high efficiency decoder 31 to be supplied to the control unit 40.

The decoded audio data DA obtained from the high efficiency decoder 31 are supplied to a digital to analog (D/A) convertor 32 to be converted to an analog sound signal forming a reproduced audio signal SA corresponding to the decoded audio data DA.

The service program data DSD derived from the program selector 30 are supplied to a decoder 33. In the decoder 33, the service program data DSD are subjected to decoding processing to produce reproduced service data DS based on the service program data DSD.

The control unit 40 is operative to produce control data DVD based on the control information data DCD from the Vitervi decoder 26, the program associated data DPA from the high efficiency decoder 31, a command signal CX supplied from an input portion 41 in response to manual operations thereto and so on and to supply the Vitervi decoder 26 with the control data DVD for controlling the operation of the Vitervi decoder 26.

Figure 3:
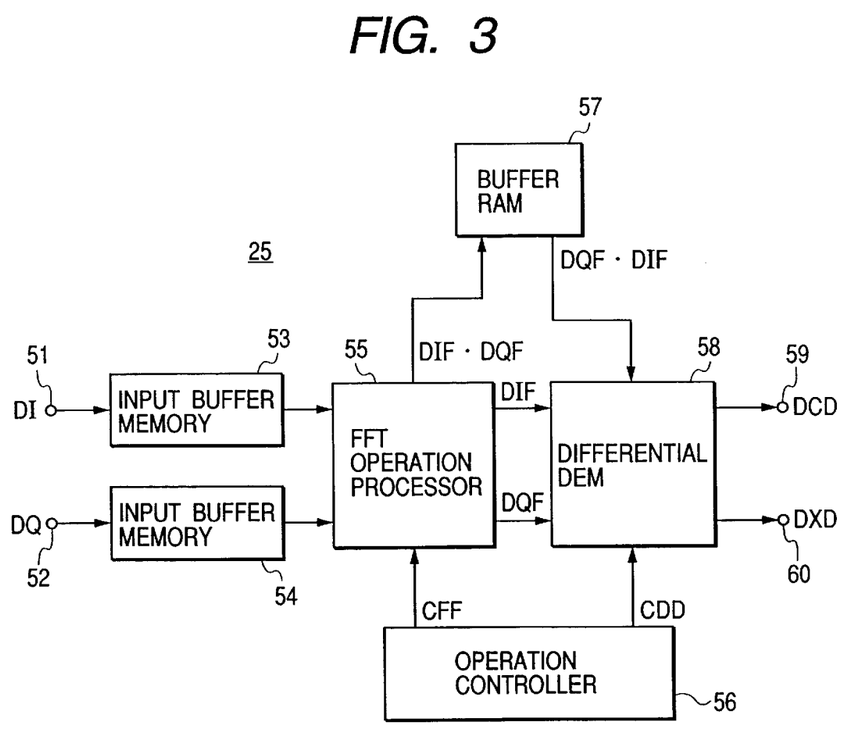
FIG. 3 is a schematic block diagram showing an example of a processing circuit for complex operation proposed previously for constituting an FFT differential demodulator employed in the digital audio broadcasting signal receiver shown in FIG. 2.

Under such a situation, the FFT differential demodulator 25 to which the I and Q signals DI and DQ are supplied and from which the control information data DCD and composite data DXD are obtained based on the I and Q signals DI and DQ, is operative to cause each of the I and Q signals DI and DQ to be subjected to complex operation processing. FIG. 3 shows an example of a processing circuit for complex operation proposed previously to constitute the FFT differential demodulator 25.

In the processing circuit for complex operation proposed for constituting the FFT differential demodulator 25 as shown in FIG. 3, the I and Q signals DI and DQ obtained from the quadrature demodulator 24 in which the digital audio broadcasting signal in the form of the digital IF signal DID is subjected to the quadrature demodulation processing are supplied through terminals 51 and 52 to be temporary stored in input buffer memories 53 and 54, respectively. Then, whenever the I and Q signals DI and DQ of signal quantity necessary for FFT processing are stored in the input buffer memories 53 and 54, the I signal DI is read from the input buffer memory 53 to be supplied to an FFT operation processor 55 and the Q signal DQ is read from the input buffer memory 54 to be supplied to the FFT operation processor 55.

The FFT operation processor 55 is formed by a complex operation processor in which an input signal thereto is subjected to complex operation processing and operates in response to an operation control signal CFF supplied to the FFT operation processor 55 from an operation controller 56. In the FFT operation processor 55, each of the I and Q signals DI and DQ is subjected to the complex operation processing as FFT processing under the directions by the operation control signal CFF from the operation controller 56 and thereby operation processing output signals DIF and DQF each representing the result of the operation processing are obtained.

The operation processing output signals DIF and DQF are temporary stored in a buffer random access memory (buffer RAM) 57 and supplied also to a differential demodulator 58. The differential demodulator 58 is also constituted by a complex operation processor in which an input signal thereto is subjected to complex operation processing and operates in response to an operation control signal CDD supplied to the differential demodulator 58 from the operation controller 56. In the differential demodulator 58, each of the operation processing output signals DIF and DQF derived from the FFT operation processor 55 is directly supplied and each of the operation processing output signals DIF and DQF read from the buffer RAM 57 is also supplied, so that the operation processing output signals DIF and DQF from the FFT operation processor 55 and the operation processing output signals DIF and DQF from the buffer RAM 57 are subjected to the complex operation processing as differential demodulation processing under the directions by the operation control signal CDD from the operation controller 56. As a result, the control information data DCD and the composite data DXD composed of the audio information data and the service information data both based on the I and Q signals DI and DQ are obtained from the differential demodulator 58 to be derived therefrom to terminals 59 and 60, respectively.

In the case where the FFT differential demodulator employed in the digital audio broadcasting signal receiver comprises an FFT operation processor for causing I and Q signals obtained from the quadrature demodulator to be subjected to FFT operation processing and a differential demodulator for causing operation processing output signals obtained from the FFT operation processor to be subjected to differential demodulation, each of which is independently provided to be constituted by a complex operation processor for causing an input signal thereto to be subjected to complex operation processing, such as the FFT operation processor 55 and the differential demodulator 58 as shown in FIG. 3 and described above, at least two complex operation processors are needed. Consequently, in such a processing circuit for complex operation as proposed previously to form the FFT differential demodulator 25 shown in FIG. 3, the circuit structure is large in scale and very complicated including operation controllers for the complex operation processors, so that efficiency in use of circuit is relatively low. These facts bring about problems and disadvantages to the processing circuit for complex operation proposed previously.

OBJECTS AND SUMMARY OF THE INVENTION

Accordingly, it is an object of the present invention to provide a processing circuit for complex operation suitable for constituting a FFT differential demodulator employed in a digital audio broadcasting signal receiver for causing quadrature demodulation output signals obtained through quadrature demodulation processing to a digital audio broadcasting signal to be subjected to complex operation processing, which avoids the aforementioned problem and disadvantages encountered with the prior art.

Another object of the present invention is to provide a processing circuit for complex operation suitable for constituting a FFT differential demodulator employed in a digital audio broadcasting signal receiver for causing quadrature demodulation output signals obtained through quadrature demodulation processing to a digital audio broadcasting signal to be subjected to complex operation processing, which has its circuit structure relatively small in scale and simplified in construction including operation controllers.

A further object of the present invention is to provide a processing circuit for complex operation suitable for constituting a FFT differential demodulator employed in a digital audio broadcasting signal receiver for causing quadrature demodulation output signals obtained through quadrature demodulation processing to a digital audio broadcasting signal to be subjected to complex operation processing, which is effectively improved in efficiency in use of circuit.

According to the present invention, there is provided a processing circuit for complex operation, which comprises first and second buffer memories in which a pair of quadrature demodulation output signals obtained through quadrature demodulation processing to a modulated carrier wave signal obtained in accordance with the OFDM system are temporary stored, respectively, a complex operation processor for causing the quadrature demodulation output signals read from the first and second buffer memories, respectively, to be subjected to complex operation processing for FFT and further for causing operation processing output signals obtained through the complex operation processing for FFT to be subjected to another complex operation processing for differential demodulation, so as to produce first and second data outputs, an operation controller operative to supply the complex operation processor with operation control signals for causing the complex operation processor to conduct the complex operation processing for FFT to the quadrature demodulation output signals and the complex operation processing for differential demodulation to the operation processing output signals obtained through the complex operation processing for FFT, and a program storing memory operative to supply the operation controller with program data for causing the operation controller to control the operations of the complex operation processor in accordance with an operation program represented by the program data so that the complex operation processor performs the complex operation processing for FFT to the quadrature demodulation output signals and the complex operation processing for differential demodulation to the operation processing output signals as time sharing processings at time share arranged in response to the data format of each of the quadrature demodulation output signals.

In the processing circuit for complex operation thus constituted in accordance with the present invention, the complex operation processing for FFT to the quadrature demodulation output signals and the complex operation processing for differential demodulation to the operation processing output signals are performed as the time sharing processings by a single complex operation processor so as to produce the first and second data outputs. In the time sharing processings, the complex operation processing for FFT to the quadrature demodulation output signals and the complex operation processing for differential demodulation to the operation processing output signals are performed at the time share arranged in response to the data format of each of the quadrature demodulation output signals.

Accordingly, the processing circuit for complex operation according to the present invention is able to carry out the complex operation processing for FFT to the quadrature demodulation output signals and the complex operation processing for differential demodulation to the operation processing output signals obtained through the complex operation processing for FFT with its circuit structure relatively small in scale and simplified in construction and effectively improved in efficiency in use of circuit. Therefore, the processing circuit for complex operation according to the present invention is suitable for constituting, for example, a FFT differential demodulator employed in a digital audio broadcasting signal receiver for causing quadrature demodulation output signals obtained through quadrature demodulation processing to a digital audio broadcasting signal to be subjected to complex operation processing.

The above, and other objects, features and advantages of the present invention will become apparent from the following detailed description taken in conjunction with the accompanying drawings.

DESCRIPTION OF THE PREFERRED EMBODIMENT

Figure 4:
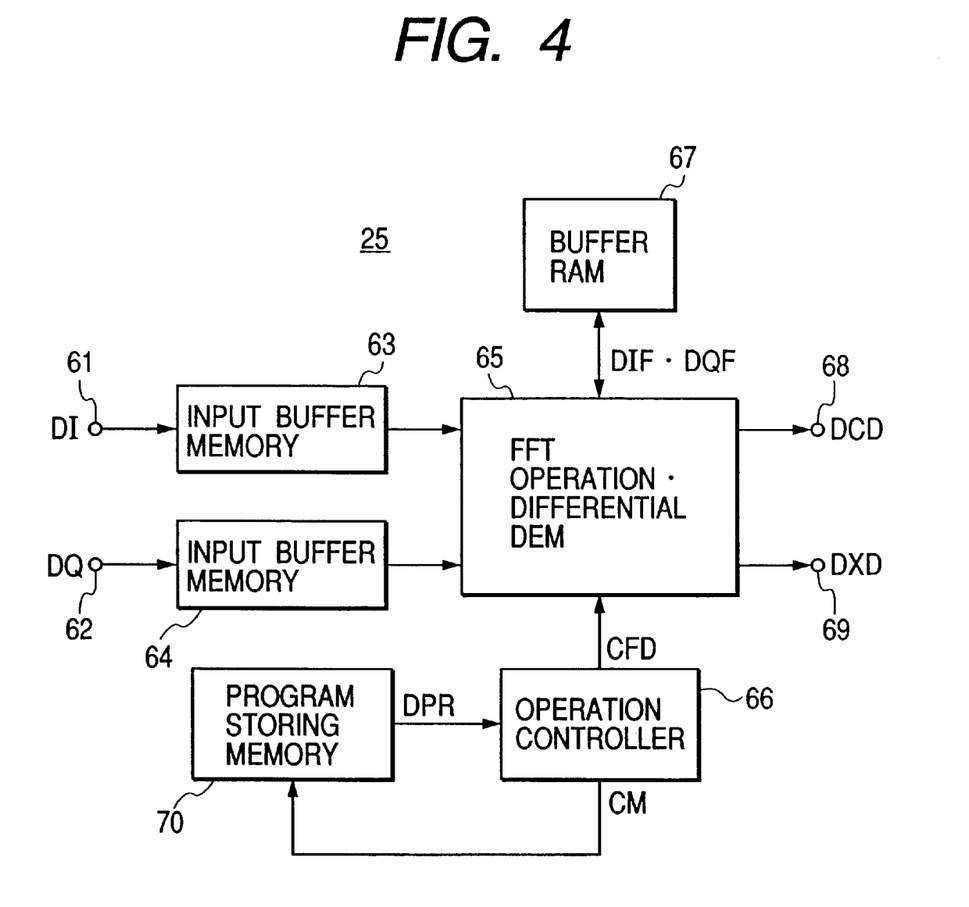
FIG. 4 is a schematic block diagram showing an embodiment of processing circuit for complex operation according to the present invention.

FIG. 4 shows an embodiment of processing circuit for complex operation according to the present invention. This embodiment shown in FIG. 4 is used for constituting the FFT differential demodulator 25 in the digital audio broadcasting signal receiver shown in FIG. 2.

Referring to FIG. 4, the I and Q signals DI and DQ obtained from the quadrature demodulator 24 in the digital audio broadcasting signal receiver shown in FIG. 2, in which the digital audio broadcasting signal, which is the modulated carrier wave signal obtained in accordance with the OFDM system, in the form of the digital IF signal DID is subjected to the quadrature demodulation processing, are supplied to terminals 61 and 62 as a pair of quadrature demodulation output signals. The I and Q signals DI and DQ thus supplied to the terminals 61 and 62 are temporary stored in input buffer memories 63 and 64, respectively.

Figure 5A:
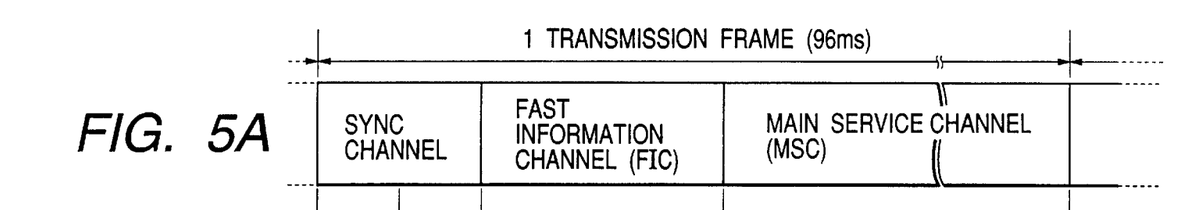
FIG. 5A to 5E are illustrations showing a data format of a digital audio broadcasting signal and time charts used for explaining the operation of the embodiment shown in FIG. 4.
Figures 5B, 5C:
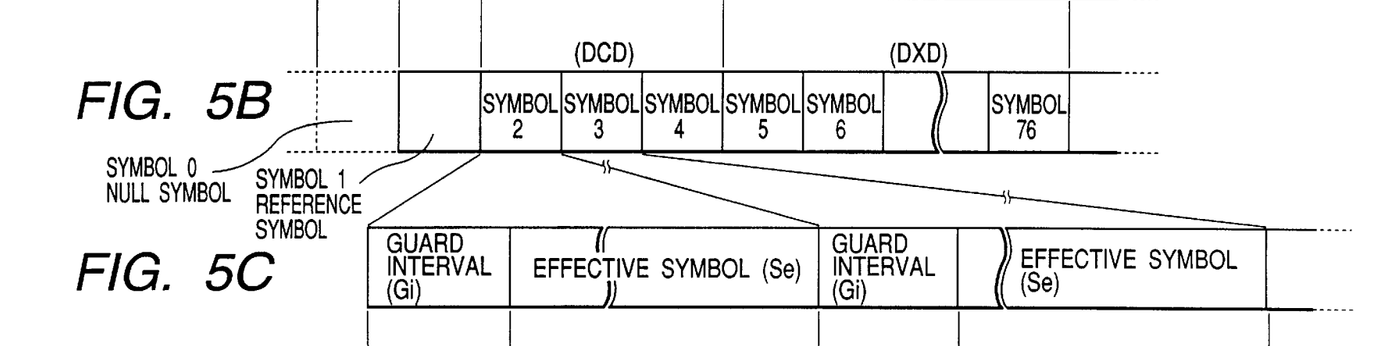

Each of the I and Q signals DI and DQ corresponds to particular portions of a data format of the digital audio broadcasting signal, one example of which is shown in FIGS. 5A, 5B and 5C. In the data format shown in FIGS. 5A, 5B and 5C, which is substantially the same as the data format shown in FIGS. 5A, 5B and 5C and aforementioned in detail and further description thereof will be omitted, portions Gi each named Guard Interval and portions Se each named Effective Symbol (FIG. 5C) are contained in each of segmental periods named Symbols and identified with Symbol 2 to Symbol 76 (FIG. 5B), which form channels named Fast Information Channel (FIC) and Main Service Channel (MSC), respectively, in a transmission frame having a time duration of, for example, 96 ms. Each of the I and Q signals DI and DQ corresponds to the portions Se each named Effective Symbol (FIG. 5C).

Then, whenever the I and Q signals DI and DQ of signal quantity necessary for FFT processing are stored in the input buffer memories 63 and 64, the I signal DI is read from the input buffer memory 63 to be supplied to an FFT operation · differential demodulator 65 and the Q signal DQ is read from the input buffer memory 64 to be supplied to the FFT operation · differential demodulator 65. The FFT operation-.differential demodulator 65 constituting a complex operation processor in which an input signal thereto is subjected to complex operation processing and operates in response to an operation control signal CFD supplied to the FFT operation · differential demodulator 65 from an operation controller 66.

The I and Q signals DI and DQ read from the input buffer memories 63 and 64, respectively, are first taken in the FFT operation · differential demodulator 65 under the directions by the operation control signal CFD from the operation controller 66. The I and Q signals D I and DQ taken in the FFT operation · differential demodulator 65 are subjected to complex operation processing for FFT (FFT operation processing) and thereby operation processing output signals DIF and DQF each representing the result of the operation processing are successively obtained. The operation processing output signals DIF and DQF are temporary stored in a buffer RAM 67.

Then, in the FFT operation · differential demodulator 65, the operation processing output signals DIF and DQF obtained successively therein and the operation processing output signals DIF and DQF read from the buffer RAM 67 to be supplied to the FFT operation.differential demodulator 65 are subjected to complex operation processing for differential demodulation (differential demodulation processing).

As a result, in the FFT operation · differential demodulator 65, control information data DCD and composite data DXD composed of audio information data and service information data are obtained as first and second data outputs based on the I and Q signals DI and DQ. The control information data DCD and composite data DXD thus obtained are derived from the FFT operation · differential demodulator 65 to terminals 68 and 69, respectively.

The operation controller 66 which is operative to supply the FFT operation · differential demodulator 65 with the operation control signal CFD and causes the FFT operation-.differential demodulator 65 to take the I and Q signals DI and DQ therein, to perform the FFT operation processing to the I and Q signals DI and DQ, and to perform the differential operation processing to the operation processing output signals DIF and DQF, operates in accordance with an operation program represented by program data DPR supplied to the operation controller 66 from a program storing memory 70. The supply of the program data DPR to the operation controller 66 from the program storing memory 70 is carried out in response to a memory control signal CM supplied to the program storing memory 70 from the operation controller 66.

Figure 5D:
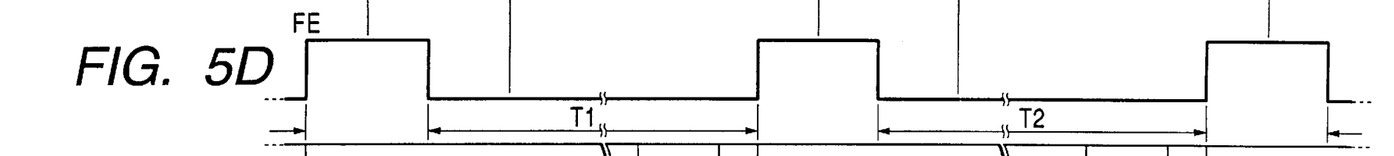

The operation for taking the I and Q signals DI and DQ from the input buffer memories 63 and 64 in the complex operation processor constituted by the FFT operation.differential demodulator 65 is carried out with use of an effective data flag signal FE as shown in FIG. 5D in response to the operation control signal CFD from the operation controller 66. The effective data flag signal FE shown in FIG. 5D has a high level during each period before and after a border between the portion Gi named Guard Interval in each of the segmental periods identified with Symbol 2 to Symbol 76 and the portion Se named Effective Symbol successive to the same portion Gi named Guard Interval and a law level during other periods. In the period during which the effective data flag signal FE has the low level, namely, each of periods T1, T2, . . . as shown in FIG. 5D, the I and Q signals DI and DQ each corresponding to each portion Se named Effective Symbol are taken from the input buffer memories 63 and 64 in the complex operation processor constituted by the FFT operation.differential demodulator 65.

Figure 5E:
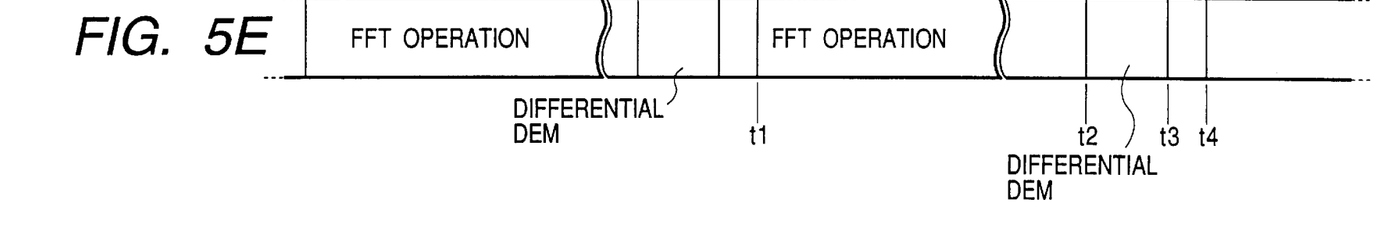

After one of the periods in each of which the effective data flag signal FE has the low level, for example, the period T1 terminates, in a period beginning with the termination of the period T1 and terminating with the termination of the period T2 during which the effective data flag signal FE has the low level next to the period T1, namely, a period from a time point ti to a time point t4 as shown in FIG. 5E, the I and Q signals DI and DQ taken in the complex operation processor constituted by the FFT operation.differential demodulator 65 in the period TI are subjected to the FFT operation processing and the operation processing output signals DIF and DQF obtained through the FFT operation processing are subjected to the differential demodulation processing.

As shown in FIG. 5E, in the period from the time point ti to the time point t4, the I and Q signals DI and DQ are subjected to the FFT operation processing in a period from the time point to to a time point t2 and the operation processing output signals DIF and DQF are subjected to the differential demodulation processing in a period from the time point t2 to a time point t3 earlier than the time point t4.

The I and Q signals DI and DQ each corresponding to the portion Se named Effective Symbol which are taken from the input buffer memories 63 and 64 in the complex operation processor constituted by the FFT operation · differential demodulator 65 in each of the period T2 during which. the effective data flag signal FE has the low level next to the period T1 and successive periods each corresponding to the period T2, are also subjected to the FFT operation processing and the differential demodulation processing in the same manner as the I and Q signals DI and DQ which are taken from the input buffer memories 63 and 64 in the complex operation processor constituted by the FFT operation · differential demodulator 65 in the period T1. This means that, in the complex operation processor constituted by the FFT operation.differential demodulator 65, the FFT operation processing to the I and Q signals DI and DQ and the differential demodulation processing to the operation processing output signals DIF and DQF obtained through the FFT operation processing are carried out as time sharing processings at time share arranged in response to the data format of each of the I and Q signals DI and DQ.

The the complex operation processor constituted by the FFT operation · differential demodulator 65 which is operative to perform the FFT operation processing to the I and Q signals DI and DQ and the differential demodulation processing to the operation processing output signals DIF and DQF obtained through the FFT operation processing as the time sharing processings at the time share arranged in response to the data format of each of the I and Q signals DI and DQ, is provided with its circuit structure relatively small in scale and simplified in construction and effectively improved in efficiency in use of circuit. This means that the processing circuit for complex operation shown in FIG. 4 in its entirety is formed also with its circuit structure relatively small in scale and simplified in construction and effectively improved in efficiency in use of circuit.

Although the above described embodiment of processing circuit for complex operation according to the present invention and shown in FIG. 4 is used for constituting the FFT differential demodulator 25 in the digital audio broadcasting signal receiver shown in FIG. 2, it should be understood that the processing circuit for complex operation according to the present invention is not limited to the embodiment shown in FIG. 4 and is able to be used for various purposes other than that described above.

What is claimed is:

1. A processing circuit for a complex operation comprising:

first and second buffer memories for temporarily storing a pair of quadrature demodulation output signals produced by quadrature demodulation processing of a modulated carrier wave signal obtained in accordance with the Orthogonal Frequency Division Multiplexing system;

a complex operation processor for causing the pair of quadrature demodulation output signals read from the first and second buffer memories, respectively, to be subjected to a first complex operation processing by performing a fast Fourier transform operation and further for causing output signals from the fast Fourier transform operation to be subjected to a second complex operation processing by performing a differential demodulation operation to produce first and second data outputs;

an operation controller for supplying the complex operation processor with operation control signals for causing the complex operation processor to perform the first and second complex operation processings; and a program storing memory for supplying the operation controller with program data for causing the operation controller to produce the operation control signals for controlling the operations of the complex operation processor in accordance with an operation program including the program data so that the complex operation processor performs the first and second complex operation processings as time sharing processings at a time share corresponding to a data format of the quadrature demodulation output signals.

2. The processing circuit for a complex operation according to claim 1, further comprising an additional memory connected to the complex operation processor for storing therein and reading therefrom the output signals from said fast Fourier transform operation.

3. The processing circuit for a complex operation according to claim 1, wherein each of the pair of quadrature demodulation output signals is formed of a series of frame units, each of which includes a plurality of segmental periods each including a Guard Interval portion and an Effective Symbol portion, and the operation controller controls the complex operation processor in accordance with the operation program to perform the fast Fourier transform operation on data in the Effective Symbol portion of each of the pair of quadrature demodulation output signals.

* * * * *